US006981694B2

(12) United States Patent
Carnahan

(10) Patent No.: US 6,981,694 B2
(45) Date of Patent: Jan. 3, 2006

(54) MOTORCYCLE STAND

(76) Inventor: Brent D. Carnahan, 1625 Arcata Dr., Redlands, CA (US) 92374

(*) Notice: Subject to any disclaimer, the term of this patent is extended or adjusted under 35 U.S.C. 154(b) by 102 days.

(21) Appl. No.: 10/657,764

(22) Filed: Sep. 8, 2003

(65) Prior Publication Data

US 2004/0099851 A1 May 27, 2004

Related U.S. Application Data

(60) Provisional application No. 60/409,829, filed on Sep. 9, 2002.

(51) Int. Cl.
*B60P 1/48* (2006.01)

(52) U.S. Cl. ..................................... 254/8 R; 254/131

(58) Field of Classification Search ................ 254/131, 254/8 R, 8 B, 8 C, 133 R, 134
See application file for complete search history.

(56) References Cited

U.S. PATENT DOCUMENTS

| | | | | |
|---|---|---|---|---|
| 2,193,647 A * | 3/1940 | Rush et al. | .................. | 5/507.1 |
| 3,667,728 A * | 6/1972 | Garelick | ..................... | 254/8 R |
| 4,193,582 A * | 3/1980 | Neilsen | ...................... | 254/131 |
| 5,232,203 A * | 8/1993 | Butts | .......................... | 254/8 R |
| 5,601,277 A * | 2/1997 | Larson | ....................... | 254/131 |
| 5,765,821 A * | 6/1998 | Janisse et al. | ................ | 269/16 |
| 5,769,396 A * | 6/1998 | Tischendorf | ................ | 254/131 |

* cited by examiner

*Primary Examiner*—Robert C. Watson

(57) ABSTRACT

A motorcycle stand comprising a base member, a raising lever member, and wheels, wherein the raising lever member is connected to the base member, the wheels are connected on the lower portion of the base member; and, wherein the vertical arc between the base member and the raising lever member is approximate 45 degrees to 90 degrees.

9 Claims, 8 Drawing Sheets

SIDE VIEW
ELEVATED REAR
TIRE

LEFT SIDE VIEW

FRONT VIEW
FIXED
HANDLE

LEFT SIDE VIEW
TELESCOPING
DETACHABLE HANDLE

TOOL TRAY

OIL TRAY

TOP VIEW

SIDE VIEW
ELEVATED REAR
TIRE

Rotating
Tool Tray

MOTORCYCLE STAND

CROSS-REFERENCE TO RELATED APPLICATION

The present application claims priority under 35 U.S.C. § 119(e) to U.S. Provisional Application No. 60/409,829, filed on Sep. 9, 2002, which is expressly incorporated by reference as though fully set forth herein.

FIELD OF THE INVENTION

The present invention relates to the raising of a vehicle and in particular a motorcycle, allowing a wheel to be elevated off the ground.

BACKGROUND OF THE INVENTION

Although the most popular, highest used models on the market are square box stands, these have severe limitations. First and foremost, the issue of lifting and placing your motorcycle to the appropriate height level and location on the stand. This requires a great deal of coordination and strength and readjustments each time the motorcycle is placed on the stand. Even though some of the smaller 80 cc race motorcycles, which weigh approximately 150 pounds, are not too difficult for this maneuver, the reality is by far, the majority of motorcycles sold are 200 to 300 pounds minimum. The dual sport motorcycles can run in the 300+ weight range. This can create back problems, as well as being dangerous for the motorcycle user.

There have been some stands which address this lifting issue, but with severe limitations. The foot lever that works the unit exerts tremendous forces, which over time bends and stretches points under load. It is very common for the user to sit upon the motorcycle while it is on the stand, which immediately overloads and can bend the current models on the market. Once the stand is bent, it is unusable or unsafe to use.

Once a motorcycle is lifted into position where you can work on it, one might find the location is not quite where you need to be working on or storing it. The current non-mobile stands, demand you lift the motorcycle, pulling it to one side of the stand, lower the motorcycle to the floor, then do a balancing act to relocate the stand, while holding the motorcycle and exerting great force again to place the motorcycle back onto the stand.

The stands on the market take up a significant amount of space. Even though they may be shipped broken down in parts; once assembled, they take up a large amount of space and are not easily broken down for transport. During use, it is helpful if the stand itself is not overly obtrusive or bulky, impeding your access to the motorcycle itself.

Even though some models may have a "shelf", intended for placement of tools or parts, this is a large, cumbersome area that is not optional. Other stands on the market don't even have the option of such an accessory.

Aluminum has been a material of choice for a lot of the stands on the market. In doing so, they have compromised strength for weight, resulting in ease of bending or stretching the stand, shortening it's life. Aluminum is still corrosive if subjected to certain chemicals or sea air.

With the present invention, lifting a motorcycle into position is done with ease. The pad at the top of the stand engages the frame rails under the motorcycle engine and with its simple levering action and minimal pressure on the raising lever, the wheels roll under the motorcycle at the same time the pad rotates on its point of contacts. This can be done with one hand and approximately 5–15 pounds of downward pressure on the raising lever, depending on the size of the motorcycle. With a little practice and finding the center of gravity of the motorcycle, you can then choose to lift the front or rear wheel of the motorcycle off the ground.

Once the motorcycle is lifted into position, the point of mobility of this present invention comes into play. With wheels supporting nearly all the motorcycle weight, and the lever stop skid on the raising lever, the motorcycle is easily moved about the shop or garage by grasping the rear fender or back of the seat. Thus, repositioning the motorcycle is now an easy task.

The present invention is small in size. It is shipped dismantled, easy to assemble and unobtrusive in its completed state. The bonus with the present invention is during transport in the back of ones truck or trailer. The main present invention hoop sits flat against the floor and is the perfect size for the most common gas cans used today, to fit directly inside the hoop of the present invention. Thus, taking up virtually no additional space. By depressing the push pin, the telescoping raising lever will collapse making the overall package extremely compact.

With the present invention, you're given options to use the present invention in its basic, unaccessorized form, or choose to place the tool tray or larger oil tray into position, as desired. The trays are easily set into place with the use of the built in "hangers", allowing quick placement or removal.

The present invention is designed to be strong and provide a lifetime service. Stainless steel has been chosen as a preferred material. The beautiful shiny steel surface is virtually non-corrosive and easily brought back to its high luster with a plastic scouring pad. The ultra high strength which stainless steel provides will maximize the life of the stand.

SUMMARY OF PREFERRED EMBODIMENTS

Summary of Invention

One objective of the present invention is to provide an easy method for a single person to support a motocross or dual sport motorcycle without having to lift the entire weight of the motorcycle by hand.

Another objective of the present invention is to provide a stand to be a fixed storage device, yet simultaneously be mobile (with the use of wheels) around ones garage or workplace while the motorcycle is elevated in place.

A third objective of the present invention is to provide a tool tray for placement for tools and parts while the motorcycle is on the present invention, elevated in place or while the present invention is lying flat on the floor without the motorcycle on it.

A fourth objective of the present invention is a slide in oil tray to provide an accessory for the changing of oil while the motorcycle is on the present invention. The oil tray can be easily removed when drained oil fluid is in the tray.

A fifth objective is to achieve the above while keeping the present invention in a very compact format. The use of simple finger push pins allow for the detachable raising lever and telescoping raising lever assembly to be removed or assembled with ease.

DETAILED DESCRIPTION OF THE INVENTION

Nomenclature

Figure 1:
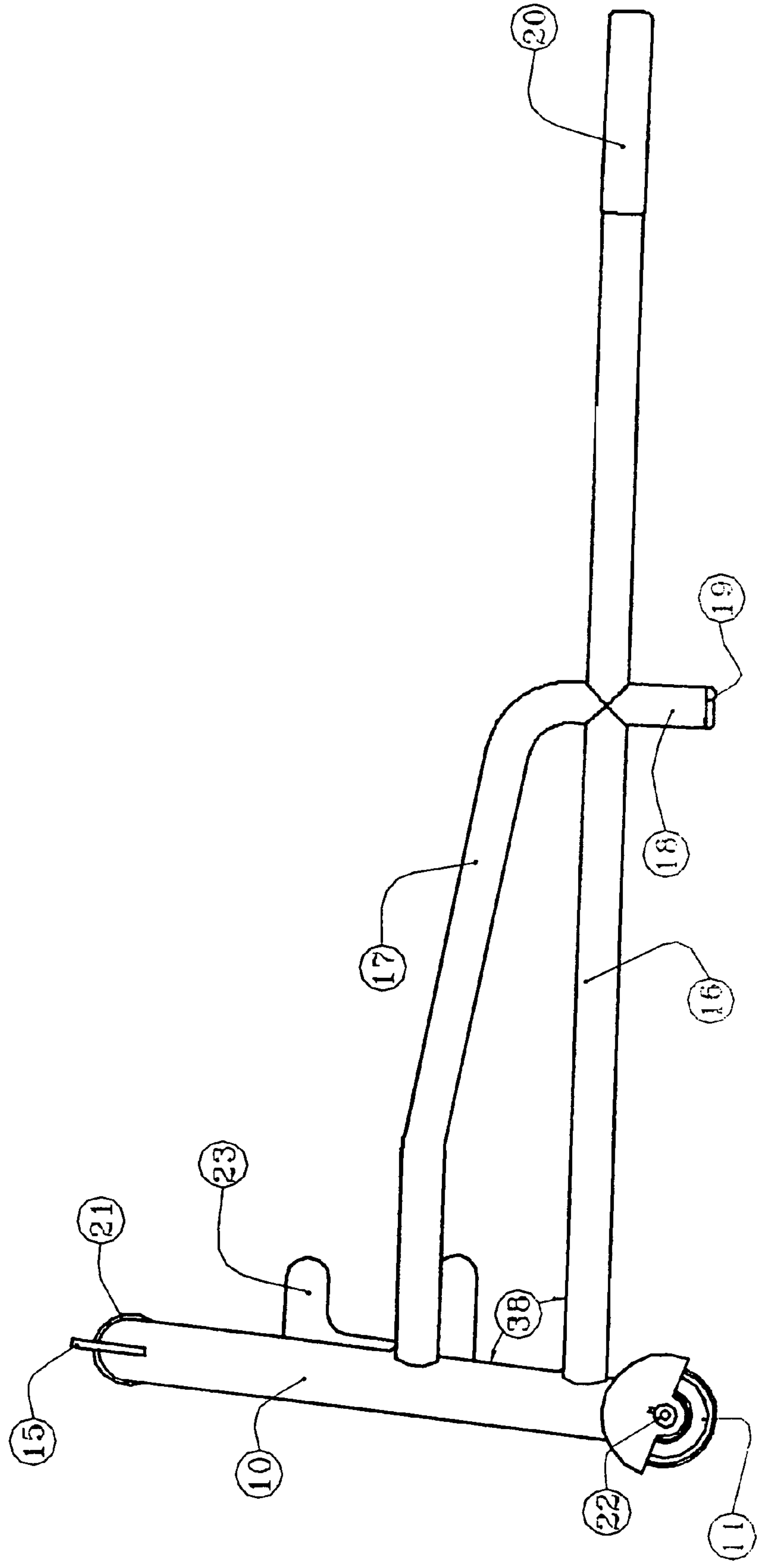
FIG. 1 is a perspective view of the first embodiment of the present invention.

10. First vertical base member
11. Second vertical base member
12. Upper horizontal base member
13. Lower horizontal base member
14. Wheel
15. Dog-ears
16. Raising lever
17. Lever brace
18. Lever stop
19. Lever stop skid
20. Raising lever grip
21. Non-slip pad
22. Axle
23. Tray attachment bracket
24 Tray support pin
31. Push pin
32. Push pin Hole
33. Lever brace base attachment
34. Raising lever base attachment
35. Detachable lever brace
36. Detachable raising lever
37. Telescoping raising lever
38. Vertical Arc
41. Tool Tray
42. Oil Tray
43. Tray Hanger
44. Tray notch
45. Drain Holes
51. Horizontal Arc With reference to the drawings, and in particular to FIGS. 1 & 3, the main member consists of first vertical base member 10, second vertical base member 11, upper horizontal base member 12, and lower horizontal base member 13. The lower horizontal base member 13, may have a wheel 14, on each end. On the upper horizontal base member 12, there is a "dog ear" 15, on each side of the upper horizontal base member 12, (near where upper horizontal base member 12 starts rounding down to the first vertical base member 10 & second vertical base member 11). These lengthen the upper horizontal base member 12, forming a platform to keep a motorcycle frame rail from sliding off the edge.

Also, on top of the upper horizontal base member 12, there is a non-slip pad 21, which is durable and fixed securely in place.

The wheels 14, with axle 22, are attached to the lower horizontal base member 13, and are made of a durable, non-compressive material.

On one side of the first vertical base member 10, or the second vertical base member 11, there is a place for attaching a raising lever 16 and lever brace 17, or the lever brace base attachment 33 and the raising lever base attachment 34, to make a detachable raising lever. To attach the detachable lever brace 35, and the detachable raising lever 36, to the lever brace base attachment 33, and the raising lever base attachment 34, there are push pin holes 32, on the detachable lever brace 35, and detachable raising lever 36, to accommodate push pins 31, on lever brace base attachment 33, raising lever base attachment 34, and telescoping raising lever 37.

Figure 3:
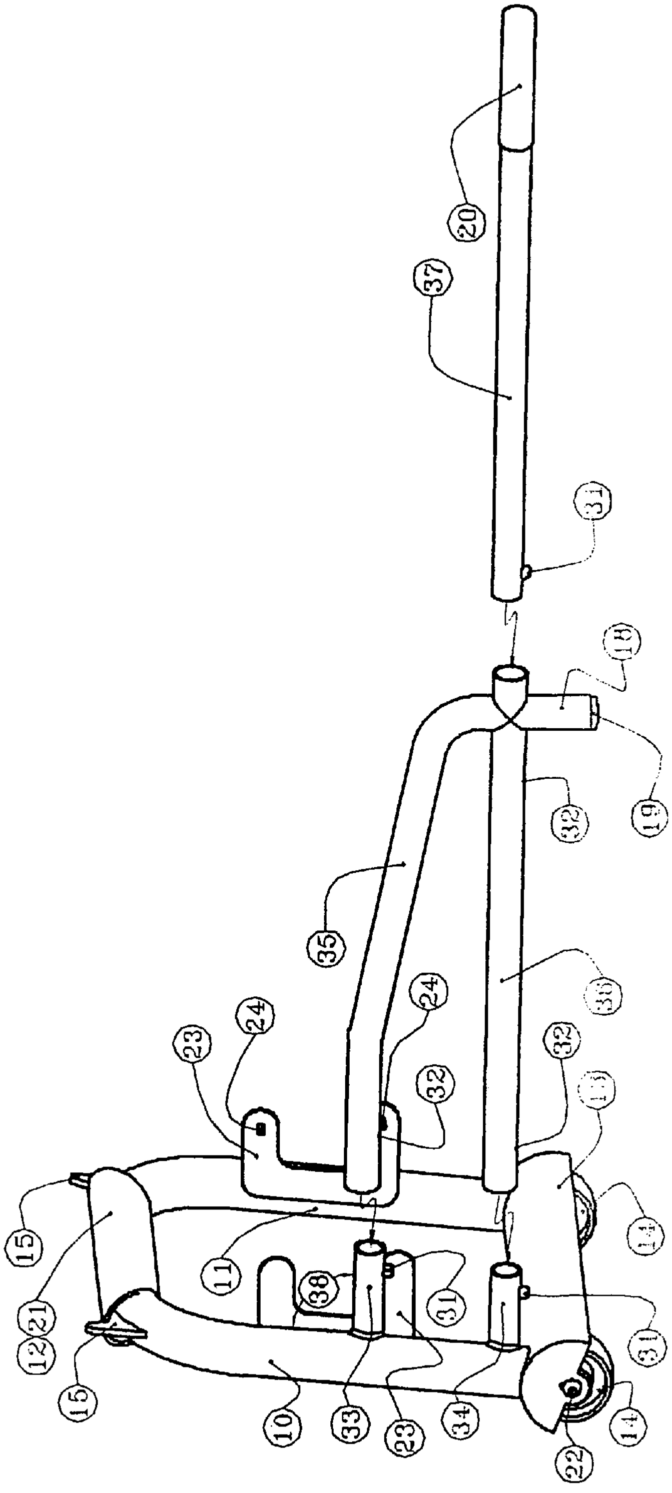
FIG. 3 is a perspective view of the second embodiment of the present invention.
Figure 5:
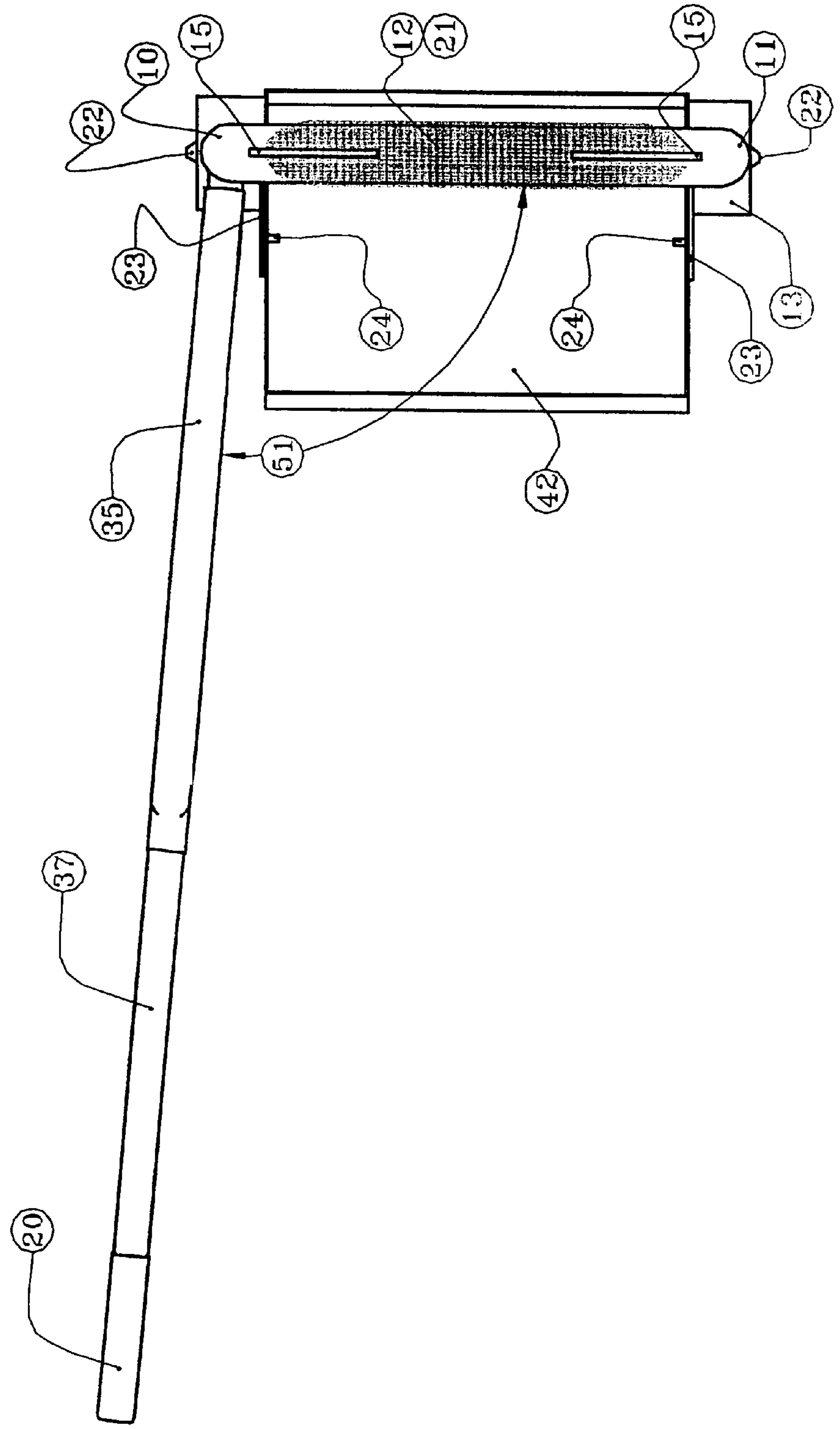
FIG. 5 is a top view of the first embodiment of the present invention.

FIGS. 1 & 3 show the positions of the vertical arc 38 and FIG. 5 depicts the horizontal arc 51, of these raising levers. Raising lever 16 and lever brace 17, and the lever brace base attachment 33 and raising lever base attachment 34, as well as the lever stop 18 with lever stop skid 19 (to aid in movement) are attached at a critical angle to allow the present invention to lock at an angle beyond center to balance (perch) the motorcycle.

The lever brace base attachment 33 and raising lever base attachment 34 are attached to the first vertical base member 10 or second vertical base member 11, to further increase length and leverage when propping up the motorcycle. The telescoping raising lever 37 may telescope into the detachable raising lever 36 for compactness. A raising lever grip 20 may be attached to raising lever 16 or telescoping raising lever 37, for gripping the present invention.

Figure 2:
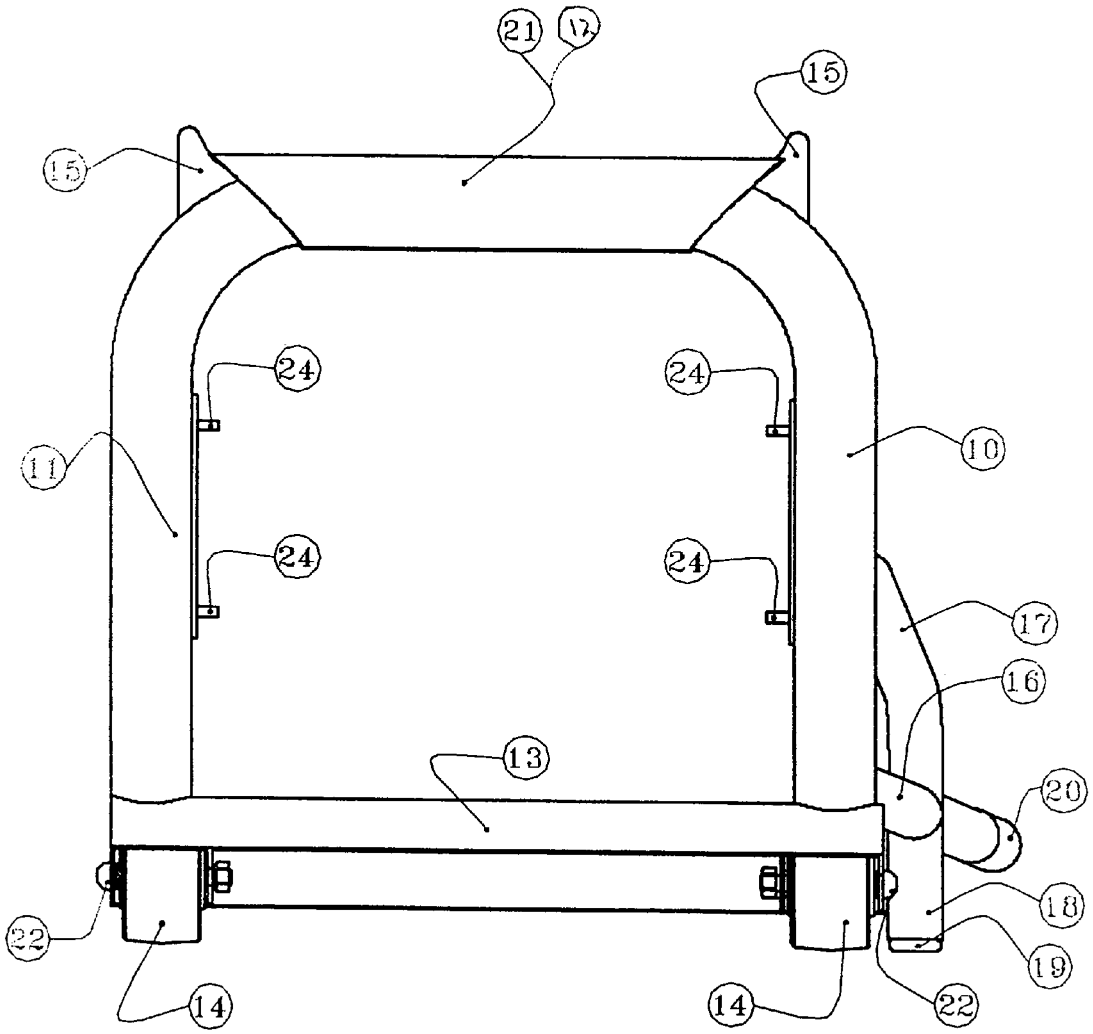
FIG. 2 is a front view of the first embodiment of the present invention.
Figure 4A:
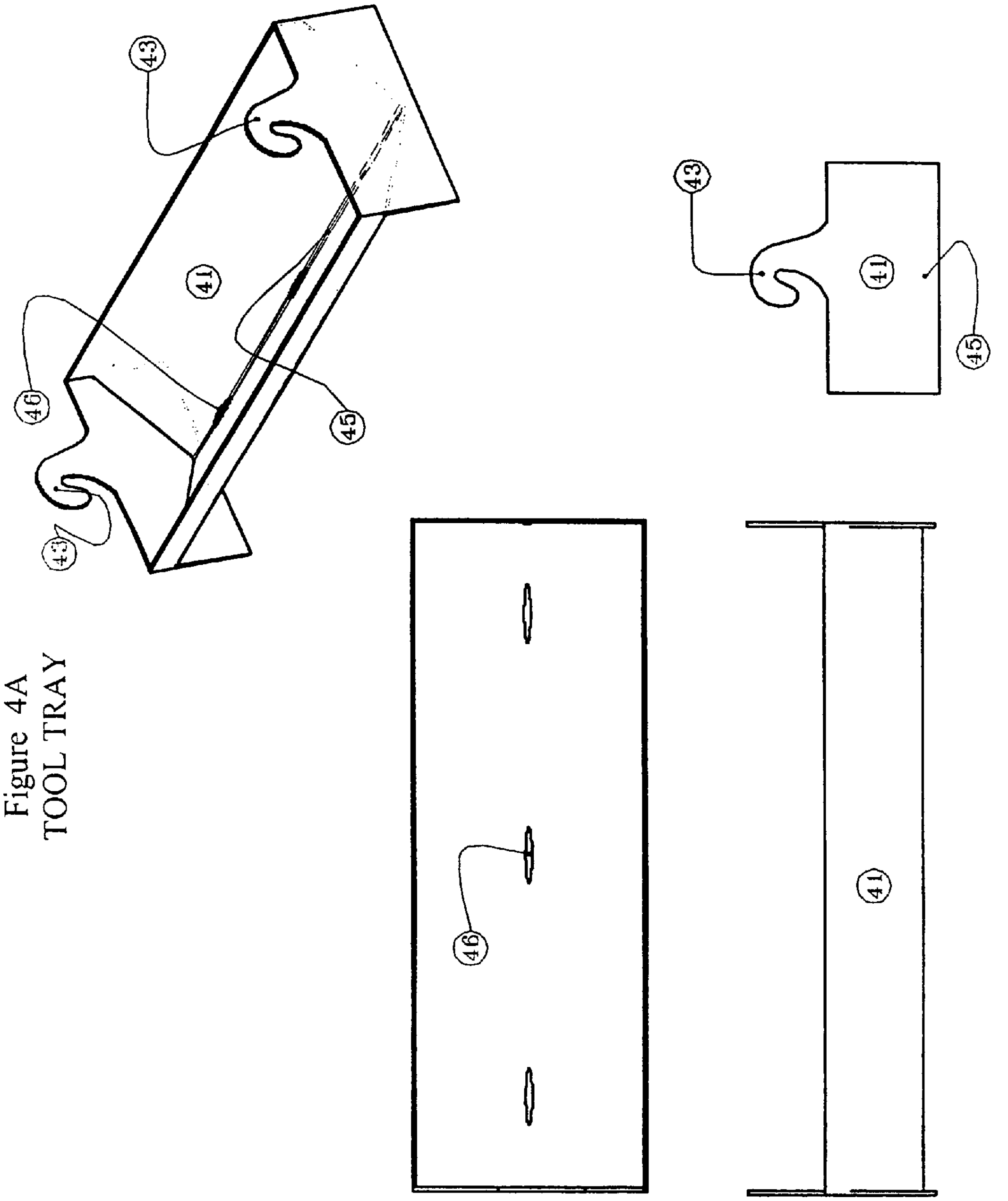
FIG. 4*a* is a perspective view of a tool tray, an accessory of the present invention.
Figure 4B:
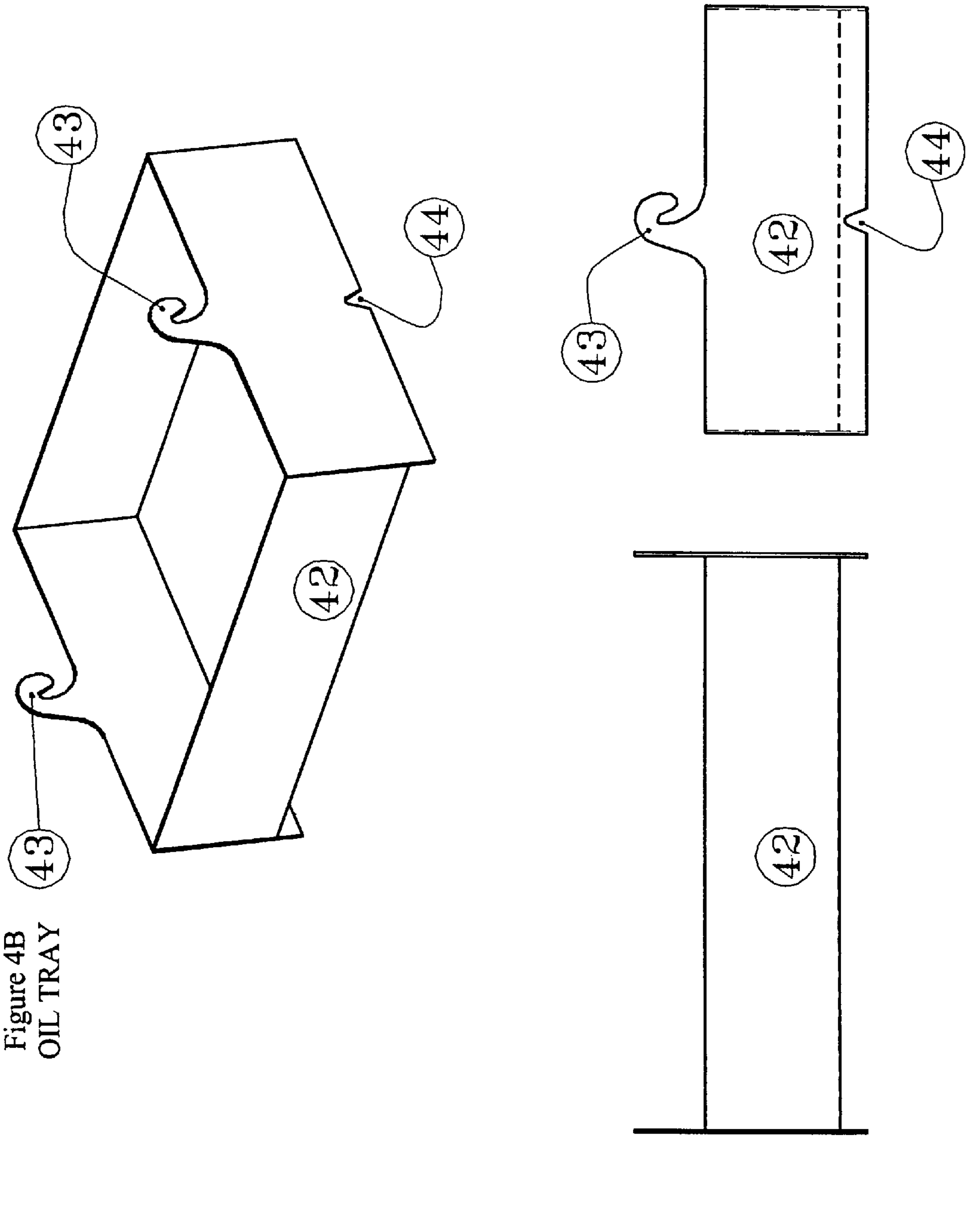
FIG. 4*b* is a perspective view of an oil tray, an accessory of the present invention.

As shown in FIG. 2, the tray attachment bracket 23, attaches to the first vertical base member 10 and the second vertical base member 11, to support tool tray 41, (tool tray is shown in FIG. 4A) or oil tray 42 (oil tray is shown in FIG. 4B). Tool tray 41 has tray hanger 43 which hangs from tray support pin 24, a single point on the first vertical base member 10 and the second vertical base member 11, allowing tray rotation to stay horizontal whether present invention, is in a vertical or horizontal position.

Drain Holes 45 are instrumental in draining water when tool tray 41 is in use during washing of motorcycle.

Oil tray 42 attaches by tray hanger 43 and tray notch 44, to all tray support pin 24 points, making tray stable in the horizontal position when present invention is vertical and collects oil drained from motorcycle.

Figure 6:
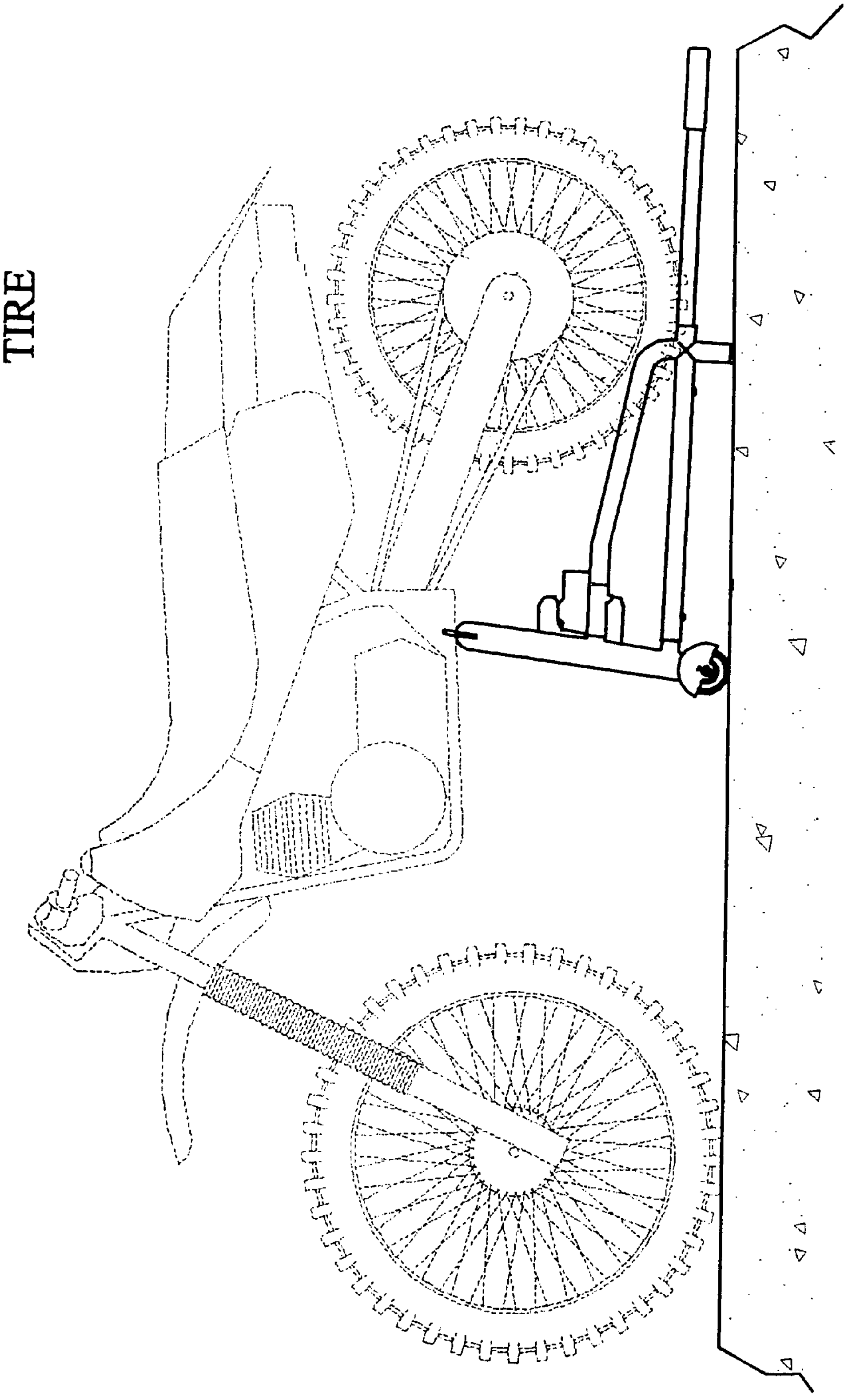
FIG. 6 is a perspective view of the present invention with motorcycle elevated.

FIG. 6 depicts a motorcycle being elevated by the present invention. The location of the present invention in the diagram is more to the rear of the motorcycle; thus the rear wheel has been elevated. If the present invention is moved toward the front of the motorcycle, then the front wheel will be elevated.

Figure 7:
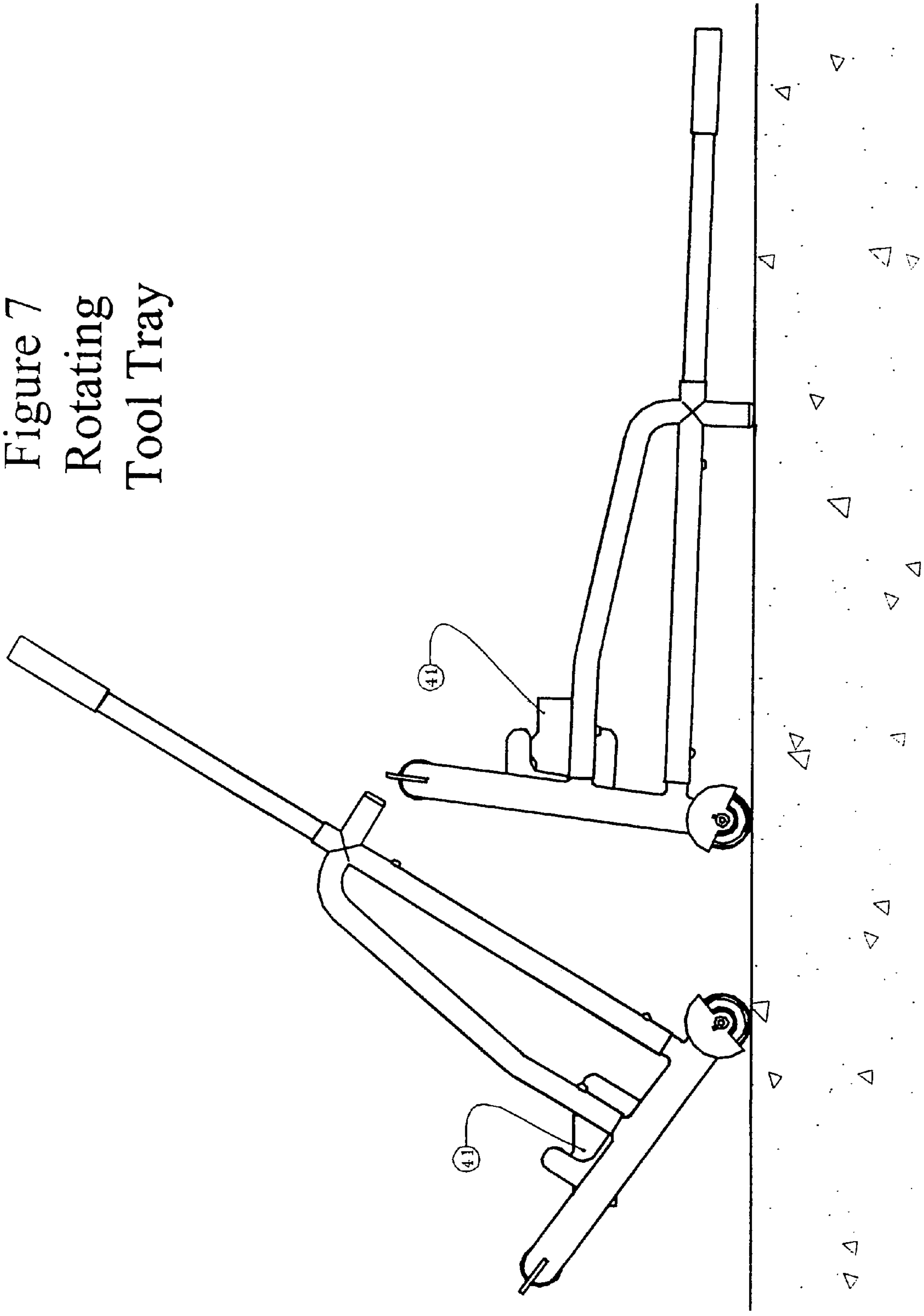
FIG. 7 is a side view of the present invention showing lifting action with tool tray.

FIG. 7 is showing the present invention in a supporting position, as well as a mid lift position. With the tool tray 41, in both diagrams, you can see how the tool tray is able to maintain a level position with the ground, as the present invention rotates up to the supporting position.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided as illustrations so that this disclosure will be thorough and complete, and will fully convey the scope of the invention to those skilled in the art. Like numbers referred to like elements throughout all drawings.

Materials used could be of wood, plastic, composite resin, carbon fibers, or preferably aluminum or steel, more preferably stainless steel. The material could be made of flat stock, square, rectangular, triangular, oval, but more preferably round stock. The main member 10, 11, 12, material could be from ¼ inch to 6 inches in diameter, preferably 1 to 3 inches in diameter, more preferably 1½ inches in diameter. The thickness of the material could be 60 wall to solid material, preferably 90 to 120 wall, more preferably 120 wall. The main member consists of the first vertical base member 10 and second vertical base member 11, which are between 6 to 20 inches, preferably between 10 to 16 inches, and more preferably 12 to 13½ inches. The upper horizontal base member 12 is between 6 to 20 inches, preferably between 8 to 15 inches, and more preferably 10 to 12 inches. The lower horizontal base member 13 is 6 to 20 inches, preferably between 10 to 16 inches and more preferably 14 to 15 inches. The lower horizontal base member 13, may have a wheel 14 from 1 to 20 inches in diameter, more preferably 2 to 8 inches in diameter, and most preferably 2½ inches in diameter on each end, inside of it. This wheel diameter thus selects the horizontal base member 13 size, preferably 3 to 4 inches, more preferably 3 inches. Holes are placed at ends of base member 13 to hold wheels 14 in place with axle 22. Wheel material could be steel, hard rubber, or pneumatic, preferably plastic, more preferably a non-compressive high impact phenolic resin with roller bearings.

The main member 10, 11, 12, could be built with the vertical and horizontal members square to one another, more preferably they are one piece bent with a 4 inch radius connecting the vertical to the horizontal member.

On the upper horizontal base member 12, there is a "dog ear" 15 on each side of the upper horizontal base member 12, (near where upper horizontal base member 12 starts rounding down to the first vertical base member 10 & second vertical base member 11). These lengthen the upper horizontal base member 12, forming a platform to keep a motorcycle frame rail from sliding off the edge. The "dog ears" are ½ to 4 inches in size, preferably ½ to 2 inches, and more preferably ½ inch.

Also, on top of the upper horizontal base member 12, there may or may not be a non-slip pad 21, preferably there is a non-slip pad to make contact with motorcycle frame rails. The pad material is nylon, plastic or rubber, preferably a rubber material, more preferably a nylon reinforced rubber which is durable and fixed securely in place.

On one side or both of the first vertical base member 10, and or the second vertical base member 11, there is a raising lever 16. This raising lever could be single or multiple levers on one or both sides of the vertical member 10 or 11, but preferably a raising lever is only on one side, and more preferably on the left side, with raising lever 16 and lever brace 17 to make a fixed raising lever, or a lever brace base attachment 33 and a raising lever base attachment 34, to make a detachable raising lever. The manor in which the lever brace 17 or detachable lever brace 35 and raising lever 16 or detachable raising lever 36 attach to each other for co-strength may be done in many different styles; by bending one to meet the other or by another piece of material joining one to the other and can be of round, square or flat shaped material. The point of raising lever or levers attachment may be anywhere along the first vertical base member 10 or second vertical base member 11, or on the lower horizontal member 13, but preferably on one vertical member, and even more preferably on the first vertical member 10, ¾ inches above the lower horizontal member 13 for the placement of the raising lever 16 or raising lever base attachment 34. The lever brace 17 or lever brace base attachment 33 is attached 4 inches above. The angle for placement of raising lever 16 and lever brace 17 or detachable lever brace 35 and detachable raising lever 36 could be attached at a right angle to the vertical member 10, but more preferably set at a 4 to 5 degree angle as shown by the vertical arc 38, which thus gives the beyond center of gravity lock point when the motorcycle is on the present invention. FIG. 5 shows the horizontal arc 51, of these raising levers. Raising lever angle could be set at a right angle to the first vertical base member 10, but preferably angles out 3 to 10 degrees, and more preferably at an angle of 4 to 5 degrees. In reference to the present invention with the removable raising lever (FIG. 3), the detachable lever brace 35 and detachable raising lever 36 length could be from 1 to 6 inches, preferably 2 to 4 inches, even more preferably 3 inches in length. The material is preferably round but not limited to being round. The diameter can be ¼ to 6 inches, preferably ½ to 2 inches, but more preferably ⅞ inches for the reason that ⅞ inches is the usual diameter of motorcycle handle bars, therefore a grip will fit on raising lever 16 or telescoping raising lever 37 for a finished look. Thus, dimensions of detachable lever brace 35 and detachable raising lever 36, becomes a 1 inch round tube to allow base attachments 33 and 34 as well as raising lever 37 to telescope into each other. Fixing these telescoping tubes to one another, may be done with rivets, preferably bolts to be removable, but more preferable with the use of finger push pins 31 to allow easy assembly or disassembly. Placement points of pinholes 32 are determined by selecting the overall length of detachable raising lever 36 and telescoping raising lever 37 when attached. The length of the raising levers would be between 6 to 48 inches, preferably 24 to 36 inches, more preferably 32 inches. With length determined, now pushpin holes 32 are placed ½ to 1 inch in from the end of base attachments 33 and 34, preferably % inches in from the end. This would be the same for the telescoping raising lever 37. Telescoping points 33 to 35 and 34 to 36, as well as 36 to 37 need to engage each other deep enough for strength and stability, preferably 2 to 6 inches, more preferably 2½ to 3 inches. Corresponding holes 32 are now placed into 35 and 36 to attach parts together with pins 31.

Tray systems may or may not be used with the present invention, and could be mounted (in regards to FIG. 2), from lower horizontal base member 13 or upper horizontal base member 12, but more preferably off the first and second vertical base member 10 and 11. Tray attachment bracket 23, is shaped to correspond with tool tray's 41, tray hangers 43 (as seen in FIG. 4A), allowing removal of tool tray, as well as free rotation of tool tray during operation of the present invention, (as seen in FIG. 7). The tray can be made of plastics, wood or metals, but preferably of stainless steel, 18 gauge.

Oil tray 42, FIG. 4B, may also be used with the present invention, and also has tray hangers 43, and a tray notch 44, to correspond with tray attachment bracket 23. This oil tray is designed to be used with the present invention being in the supporting position and is designed to engage both tray support pins 24, at the same time, thus locking the oil tray level with the ground, not allowing the oil tray to rotate during use. Oil tray material, as tool tray 41, could be of various materials, but stainless steel, 16-gauge ends and 18-gauge body is preferred.

What is claimed is:

1. A motorcycle stand comprising: a base member; a raising lever; dog ear members; a non-slip pad; and, wheels; wherein the base member is comprised of a first vertical base member, a second vertical base member, an upper horizontal base member, and a lower horizontal base member; wherein the base member (and/or raising lever) is adapted to support a tray; wherein the non-slip pad is attached on the upper horizontal base member; wherein the dog ear members are attached to the upper horizontal base member; wherein the wheels are connected to the lower horizontal base member, wherein the raising lever is connected to the base member; wherein the raising lever further comprises a lever stop and a lever stop skid; wherein the base member and the raising lever are comprised of stainless steel and, wherein the vertical arc between the base member and the raising lever is approximately 80 degrees to 90 degrees.

2. The stand of claim 1, wherein the tray can pivot to stay horizontal relative to the ground when the raising lever is moved from vertical to perpendicular relative to the ground.

3. The stand of claim 1, wherein the raising lever member further comprises: a lever brace member, and a telescoping raising lever member; wherein the lever brace member is connected to the base and raising lever member; and, wherein the telescoping raising lever member is connected to the raising lever member.

4. The stand of claim 3, wherein the raising lever member and lever brace member are detachable from the base member and the telescoping raising lever member.

5. The stand of claim 4, wherein the raising lever member and lever brace member are connected by a flat connecting member.

6. The stand of claim 1, wherein the base member and the raising lever are comprised of tubular metal.

7. The stand of claim 1, wherein the raising lever member and lever brace member are connected by a flat connecting member.

8. The stand of claim 4, wherein the base member and the raising lever are comprised of tubular metal.

9. The stand of claim 4, wherein the tray can pivot to stay horizontal relative to the ground when the raising lever is moved from vertical to perpendicular relative to the ground.

* * * * *